United States Patent
Guo et al.

(10) Patent No.: US 8,824,301 B2
(45) Date of Patent: Sep. 2, 2014

(54) METHOD AND APPARATUS TO PROVIDE ASSISTANCE INFORMATION FOR RECONFIGURATION IN A WIRELESS COMMUNICATION SYSTEM

(75) Inventors: Yu-Hsuan Guo, Taipei (TW); Meng-Hui Ou, Taipei (TW)

(73) Assignee: Innovative Sonic Corporation, Taipei (TW)

( * ) Notice: Subject to any disclaimer, the term of this patent is extended or adjusted under 35 U.S.C. 154(b) by 172 days.

(21) Appl. No.: 13/494,451

(22) Filed: Jun. 12, 2012

(65) Prior Publication Data

US 2012/0320791 A1    Dec. 20, 2012

Related U.S. Application Data (60) Provisional application No. 61/497,263, filed on Jun. 15, 2011.

(51) Int. Cl.
*H04L 1/20* (2006.01)
*H04L 12/28* (2006.01)
*G08C 17/02* (2006.01)
*H04B 7/185* (2006.01)

(52) U.S. Cl.
USPC .......... 370/236; 370/254; 370/311; 455/13.4; 455/522

(58) Field of Classification Search
CPC . H04W 52/00; H04W 52/02; H04W 52/0203; H04W 52/0212; H04W 52/0219; H04W 52/0235; H04W 52/0238; H04W 52/0261; H04W 52/0277; H04W 36/0055; H04W 72/00; H04W 72/02; H04W 72/042; H04W 72/082; H04W 72/085; H04W 72/1215; H04W 72/0413; H04W 24/00; H04W 24/02; H04W 24/08; H04W 24/10; Y02B 60/50
USPC ......... 370/229–240, 254, 310–350; 455/13.4, 455/127.1, 343.1–343.5, 431–466, 522, 455/573–574
See application file for complete search history.

(56) References Cited

U.S. PATENT DOCUMENTS

| | | | |
|---|---|---|---|
| 8,700,105 B2 * | 4/2014 | Lee et al. | 455/574 |
| 2012/0115469 A1 * | 5/2012 | Chen et al. | 455/434 |
| 2012/0173901 A1 * | 7/2012 | Soliman et al. | 713/320 |
| 2013/0003577 A1 * | 1/2013 | Gupta et al. | 370/252 |
| 2013/0301500 A1 * | 11/2013 | KOC et al. | 370/311 |
| 2014/0022990 A1 * | 1/2014 | Guo et al. | 370/328 |
| 2014/0036794 A1 * | 2/2014 | Koc et al. | 370/329 |
| 2014/0092799 A1 * | 4/2014 | Jain et al. | 370/311 |

FOREIGN PATENT DOCUMENTS

| | | |
|---|---|---|
| EP | 2061192 A1 | 5/2009 |
| WO | 2010025774 A1 | 3/2010 |
| WO | 2010105145 A1 | 9/2010 |

OTHER PUBLICATIONS

TSG-RAN WG2 Meeting #61bis, Shenzhen, China, Mar. 31 to Apr. 4, 2008.
3GPP TSG-RAN WG2 Meeting #59bis, Shanghai, China, Oct. 8-12, 2007.
3GPP TSG RAN WG2#60, Nov. 5-9, 2007, Jeju, Korea.
3GPP TSG RAN2 LTE Ad Hoc Meeting, Cannes, France, Jun. 27-30, 2006.
Search Report on corresponding EP Patent Apptication No. 12004523,2 dated Feb. 13, 2013.

* cited by examiner

*Primary Examiner* — Tri H Phan
(74) *Attorney, Agent, or Firm* — Blue Capital Law Firm, P.C.

(57) ABSTRACT

A method and apparatus are disclosed to provide assistance information for reconfiguration in a wireless communication system. In one embodiment, the method comprises providing, from a UE (user equipment), information to an eNB (evolved Node B) to indicate whether there is buffered data or no buffered data for a radio bearer, a logical channel, or a service.

10 Claims, 8 Drawing Sheets

METHOD AND APPARATUS TO PROVIDE ASSISTANCE INFORMATION FOR RECONFIGURATION IN A WIRELESS COMMUNICATION SYSTEM

CROSS-REFERENCE TO RELATED APPLICATIONS

The present application claims the benefit of U.S. Provisional Patent Application Ser. No. 61/497,263 filed on Jun. 15, 2011, the entire disclosure of which is incorporated herein by reference.

FIELD

This disclosure generally relates to wireless communication networks, and more particularly, to a method and apparatus to provide assistance information for reconfiguration in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure for which standardization is currently taking place is an Evolved Universal Terrestrial Radio Access Network (E-UTRAN). The E-UTRAN system can provide high data throughput in order to realize the above-noted voice over IP and multimedia services. The E-UTRAN system's standardization work is currently being performed by the 3GPP standards organization. Accordingly, changes to the current body of 3GPP standard are currently being submitted and considered to evolve and finalize the 3GPP standard.

SUMMARY

A method and apparatus are disclosed to provide assistance information for reconfiguration in a wireless communication system. In one embodiment, the method comprises providing, from a UE (user equipment), information to an eNB (evolved Node B) to indicate whether there is buffered data or no buffered data for a radio bearer, a logical channel, or a service.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project" referred to herein as 3GPP, including Document Nos. RP-110454, "LTE RAN Enhancements for Diverse Data Applications"; 82-112817, "Considerations for Evaluation Methods and Simulation Modeling"; R2-112037, "Discussion on Management of Diverse Data Applications"; R2-105477, "UE power saving and fast dormancy in LTE network"; TS 36.321 V10.1.0, "MAC protocol specification (Release 10)"; TS 36.331 V10.1.0, "RRC protocol specification (Release 10)"; and TS 23.203 V11.1.0, "Policy and charging control architecture (Release 11)". The standards and documents listed above are hereby expressly incorporated herein.

Figure 1:
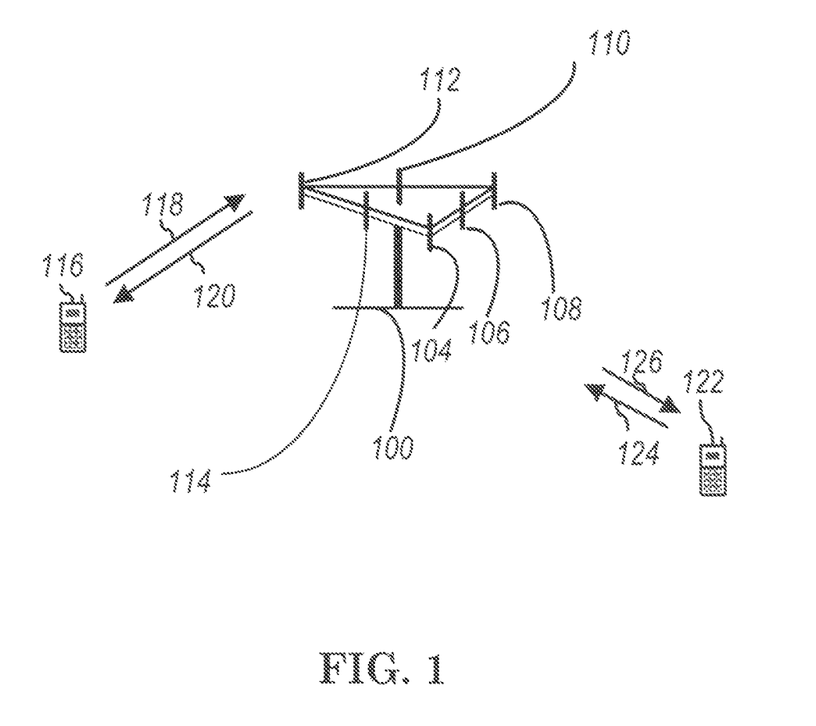
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
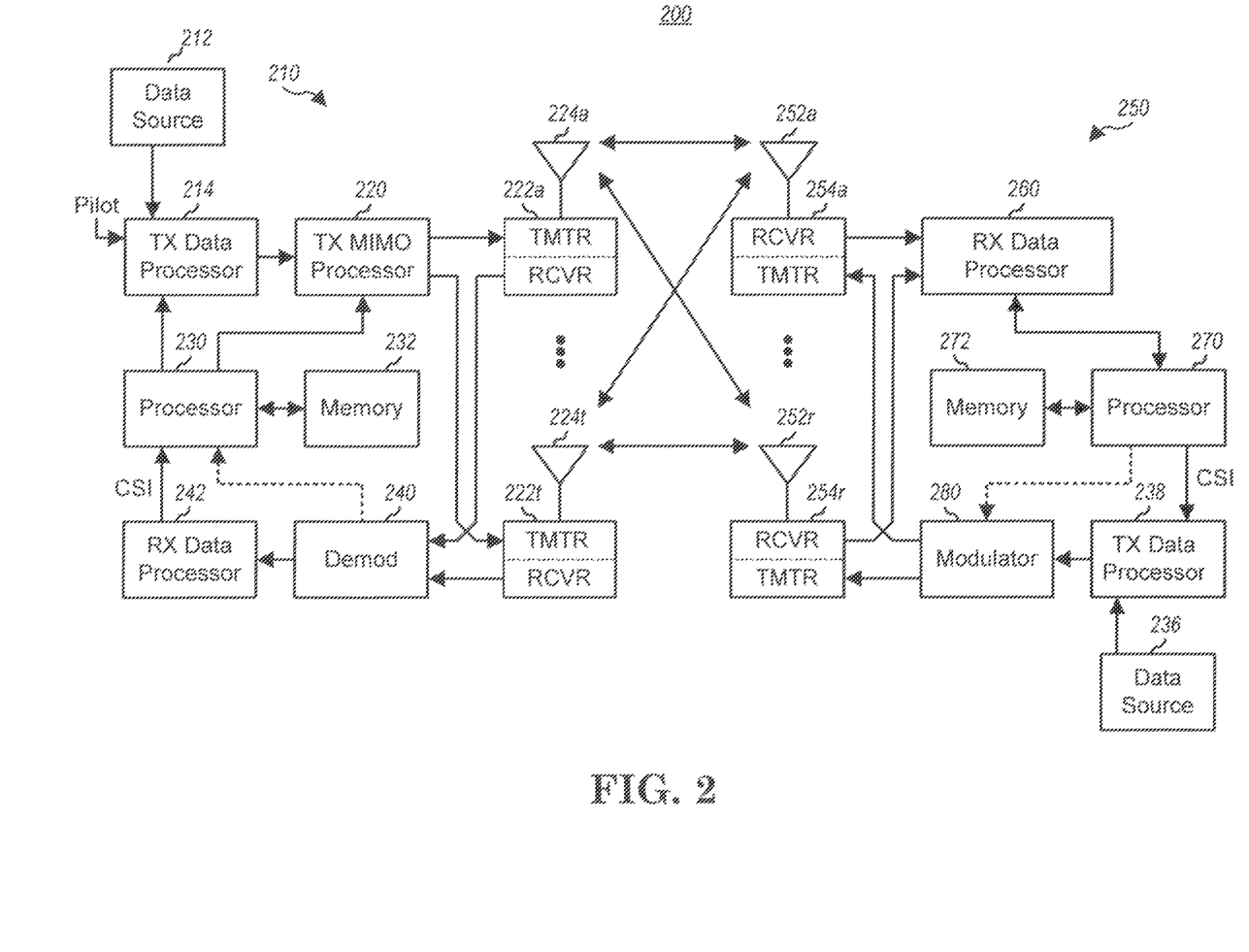
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner, and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
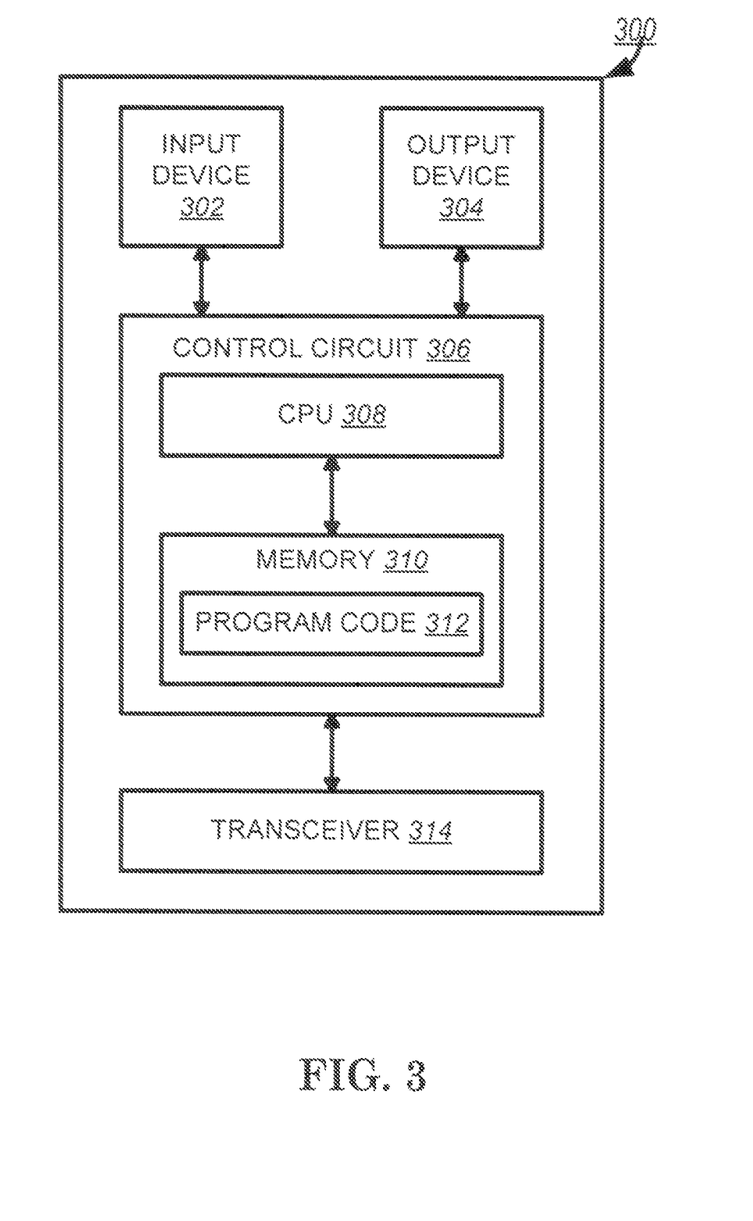
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1, or for realizing the eNB (or base station) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly.

Figure 4:
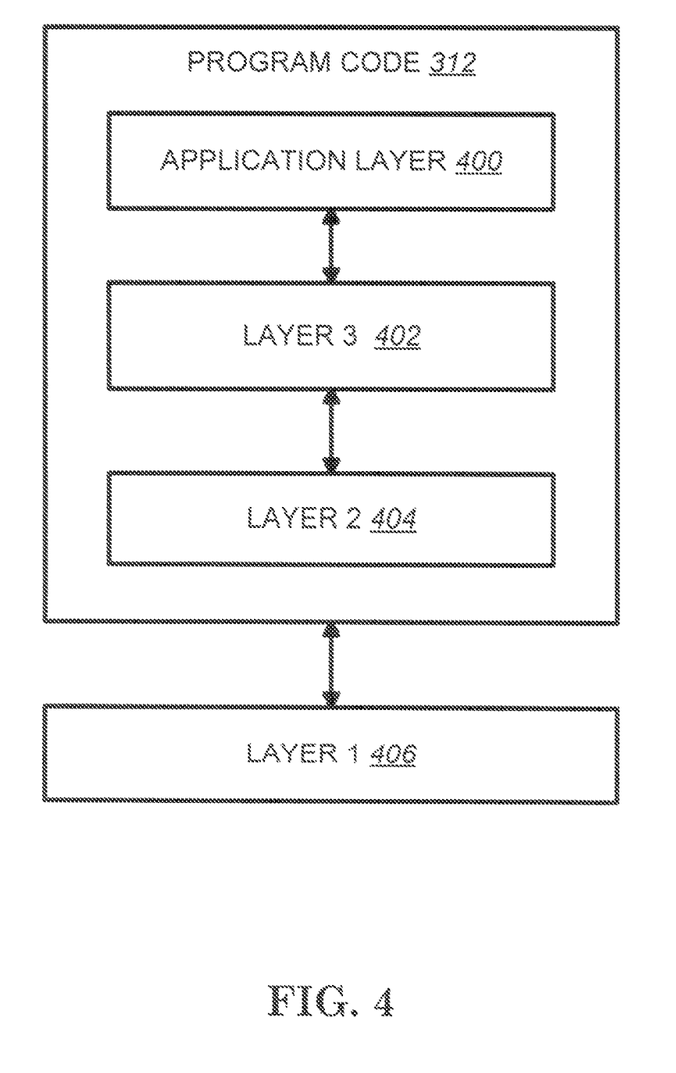
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

The range of device types utilizing current mobile networks continues to expand, encompassing, as examples, smartphones, laptops, netbooks, tablets, and embedded modems. Many are capable of running a wide variety of data applications, often in parallel. Numerous applications require that an always-on mobile-broadband experience is seamlessly delivered and presented to the end user. When attempting to provide such always-on connectivity at the RAN level, trade-offs are often encountered between UE power consumption, user experience, data transfer latency, network efficiency and control plane signaling overhead.

Therefore, per 3GPP document RP-110454, the work item "Enhancements for diverse data applications" for LTE release 11 is under discussion to generate the necessary improvements. In general, RRC (Radio Resource Control) state control mechanisms and DRX (Discontinuous Reception) configurations may be optimized with particular applications in mind but these may not remain optimal as different applications are installed/started/stopped on the device and as the consequent traffic profile of the device changes over time.

Under this work item, enhancements in the following areas would be considered:

Enhancements, within existing RRC states, to RRC state-control mechanisms and RRM (Radio Resource Management) mechanisms that offer system efficiency improvements and/or reduced UE power consumption for devices exhibiting a continued but intermittent data activity.

Enhancements to DRX configuration/control mechanisms to be more responsive to the needs and activity of either single or multiple applications running in parallel, with improved adaptability to time-varying traffic profiles and to application requirements, thereby allowing for an improved optimization of the trade-off between performance and UE-battery-consumption.

Efficient management of system resources (e.g. UL control channel resources) for connected mode UEs that are temporarily inactive, facilitating potentially larger user populations in connected mode.

For the above enhancements, knowledge from both the UE and the network should be considered where possible.

3GPP document R2-112817 proposes two alternatives to move the enhancements forward, including:

Alternative 1 (Alt1)—Efficient configurations for long-lived RRC_Connected mode.

Alternative 1 (Alt2)—Optimal mechanisms for state transitions between RRC_Idle mode and RRC_Connected mode.

Figure 5:
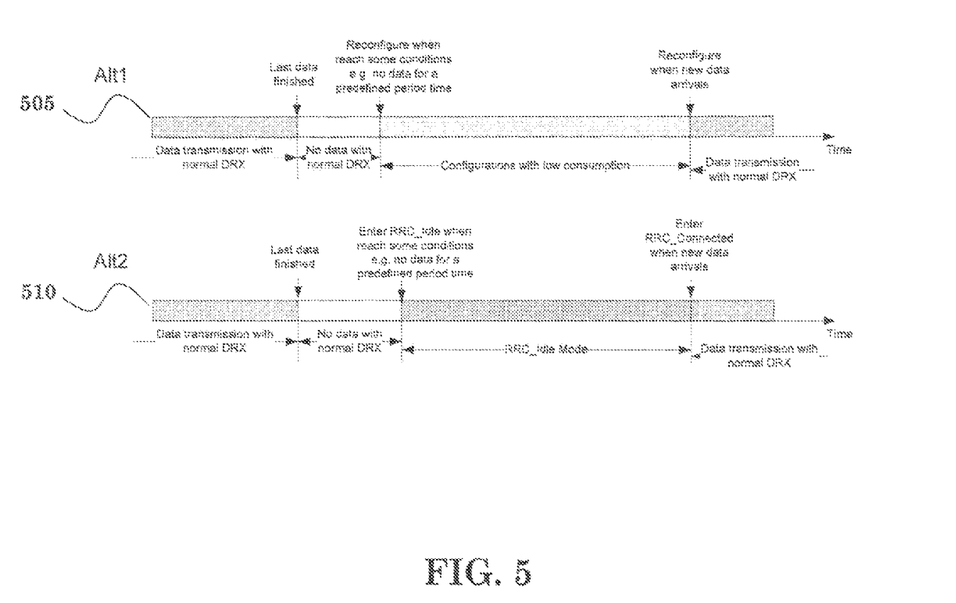
FIG. 5 is a chart according to one exemplary embodiment.

FIG. 5 illustrates the two alternatives (505 and 510). In Alt1 (505), when there is data transmission ongoing, the UE is configured by eNB with normal DRX configuration. After the last data transmission is finished and some conditions are reached (e.g., when there is no more data transmission for a predefined period of time), the UE is reconfigured by eNB with configurations which are low power consumption. If new data to be transmitted arrives, the UE is reconfigured with normal DRX configuration. So, power saving is achieved by switching between different configurations. In Alt2 (510), when there is data transmission ongoing, the UE is configured by eNB with normal DRX configuration. After the last data transmission is finished and some conditions are reached (e.g., when there is no more data transmission for a predefined period of time), the UE is requested by eNB to enter RRC_Idle mode. If new data to be transmitted arrives, the UE would attempt to enter RRC_Connected mode to transmit data. After entering RRC_Connected mode, the UE is configured with normal DRX configuration. So, power saving is achieved by RRC state switching between different RRC modes.

It is further discussed in 3GPP document R2-112037 that if there is no DL (downlink) traffic, eNB (evolved Node B) could configure UE to RRC_Connected mode. In general, eNB has the full knowledge to control the state transition or DRX configuration with respect to DL transmission. However, for UL (uplink) transmission, eNB would only know the transmission requirement from BSR (Buffer Status Report). The BSR is generally used to indicate the amount of buffered data available for transmission per logical channel group and the details of the BSR can be found in TS 36.321 V 10.1.0. In general, the possible enhancement proposed in 3GPP document R2-112037 is some kind of UE-assisted mechanism to provide extra information of UL transmission. For example, if UE can send an indication of end of UL transmission, eNB could configure longer DRX cycle for power saving.

Furthermore, 3GPP document R2-105477 proposes defining one UL message (e.g., UEPowerSavingRequest) for UE to indicate to the network that it wants to move to power saving mode, (such as, when UE knows that it does not expect UL data in the near future). Once eNB receives the message, eNB could release the RRC connection of UE, reconfigure the UE, or do nothing. In addition, details about DRX could be found in 3GPP TS 36.321 V10.1.0; and details of RRC state transition could be found in TS 36.331 V10.1.0.

If eNB decides to keep a UE in RRC_CONNECTED, it is assumed that eNB would reconfigure the UE with different configurations (such as, DRX, CQI, SRS, measurement, or etc.), depending on whether there is activity (for example, data transmission) from the always-on service(s) in the UE to save UE power and radio resources.

When an always-on service starts activating (for example, an e-mail application checks the new e-mail), eNB would know there is UL data pending in the UE by BSR, as discussed in 3GPP TS 36.321 V 10.1.0. However, the information from the BSR may not be enough for eNB to reconfigure the UE with optimal configurations for the service because BSR could only indicate that there is data available for transmission per logical channel group. Furthermore, eNB may not know exactly which service has activity in the beginning, especially when there are multiple always-on services running in parallel. Under these circumstances, UE may end up with non-optimal configurations and/or may need to be reconfigured again.

Also, different services may have different characteristics (such as traffic periodicity, volume of traffic, required QoS, or etc.). As an example discussed in 3GPP TS 23.203 V11.1.0, although voice, live streaming video, and interactive game have the same QCI (QoS Class Identifier), it is likely that their traffic pattern would not be the same. Non-optimal configurations may result in poor performance of service or unnecessary UE power consumption.

In general, to let eNB know exactly which service has activity, a UE could provide data-availability information to eNB about whether or not there is data available for transmission (or there will be activity) per radio bearer, logical channel, or service. In this embodiment, the data-availability information is not related to how much data per radio bearer, logical channel, or service would be available for transmission. The data-availability information could be carried by a RRC message or a MAC Control Element. The data-availability information could also be a 1-bit indication or an identifier for a radio bearer, logical channel, or service. When eNB receives the information, eNB could reconfigure the UE with optimal configuration corresponding to the service having activity (such as having data for transmission).

Figure 6:
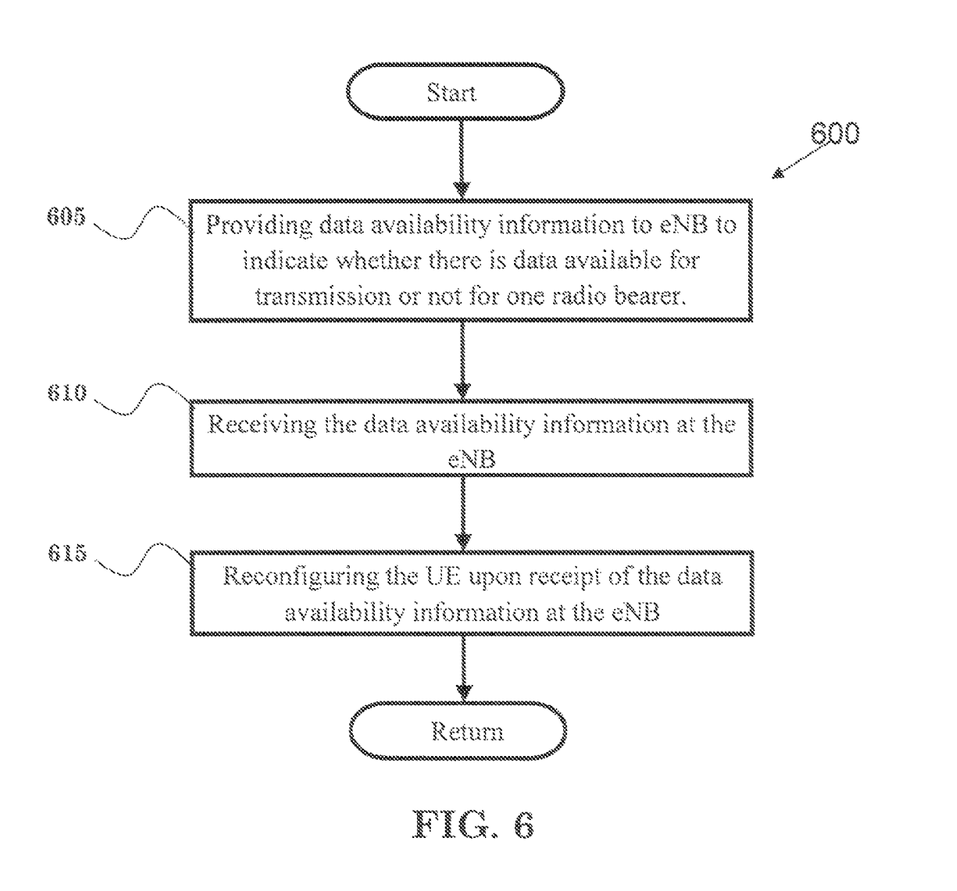
FIG. 6 illustrates a flow chart in accordance with one exemplary embodiment.

FIG. 6 illustrates a flow chart 600 in accordance with one exemplary embodiment. In step 605, the UE provides data-availability information to eNB to indicate whether there is buffered data or no buffered data for transmission for a radio bearer. In one embodiment, the data-availability information could indicate whether there is buffered data or no buffered data for transmission for a logical channel or a service. In step 610, the eNB receives the provided information. In step 615, the eNB reconfigures the UE upon receipt of the provided information. In one embodiment, the data-availability information could include one (1) bit to indicate whether there is buffered data or no buffered data for transmission for a radio bearer (or a logical channel or a service). The data-availability information could also be a bitmap in which each bit of the bitmap indicates whether or not there is data for transmission for a particular radio bearer, logical channel, or service. Furthermore, the data-availability information could include an identifier for the radio bearer, logical channel, or service that has buffered data or that has or will have activity (e.g., UL or DL transmission between the UE and the eNB).

In one embodiment, the data-availability information could be carried by a RRC message or a MAC Element. Furthermore, the UE could trigger a transmission of the data-availability information when a BSR is triggered. Alternatively, the UE could trigger a transmission of the data-availability information when the radio bearer goes from having buffered data to having no buffered data to transmit, or from having no buffered data to having buffered to transmit. The UE could also trigger a transmission of the data-availability information when the radio bearer, the logical channel, or the service goes from having activities to having no activities, or from having no activity to having activities.

Referring back to FIGS. 3 and 4, the UE 300 includes a program code 312 stored in memory 310. In one embodiment, the CPU 308 could execute the program code 312 to provide, from the UE, data-availability information to an eNB to indicate whether there is buffered data or no buffered for a radio bearer, a logical channel, or a service to transmit. In addition, the CPU 308 can execute the program code 312 to perform all of the above-described actions and steps or others described herein.

In addition, keeping a UE in RRC_CONNECTED (e.g., Alt1 shown in FIG. 5 and discussed in 3GPP document R2-112817) would likely consume more UE power compared to release RRC connection of UE (e.g., Alt2 in shown in FIG. 5 and discussed in 3GPP document R2-112817). However, if RRC connection of UE is released, it would require more exchanged signaling (e.g., for connection establishment, security activation, and etc.), and longer latency to resume transmission when an always-on service starts activating again. Since eNB decides whether to keep the UE in RRC_CONNECTED (which has more power consumption and less latency) or release the RRC connection of the UE (which has less power consumption and more latency), it would be better for the UE to provide some specific UE assistance information to help eNB make the decision (e.g., power consumption vs. latency). On the other hand, from the network point of view, if the UE handovers to another cell, it would be difficult for the eNB of the new cell to learn how to select and set up suitable configuration without some assistance from the old cell.

In general, the UE could send, report, or provide some specific UE-assistance information to the eNB in order to facilitate or enable the eNB to make certain decisions, such as deciding the power saving choice (as shown, for example, in Alt. 1 or Alt. 2 of FIG. 5 and discussed in 3GPP document R2-112817). In one embodiment, the UE would send, report, or provide the specific UE-assistance information to the eNB at a particular or selected timing, such as at the end of a UL transmission, at the end of a UL transmission of a service, in a RRC connection establishment procedure, in a handover procedure, or in a RRC connection re-establishment procedure. Furthermore, the content of the specific UE-assistance information could vary, such as the remaining power of the UE, the UE preference about the power saving configuration, or the duration of the UE stayed in RRC_Idle last time. In another embodiment, the specific UE-related information could be sent, reported, or provided from a source eNB to a target eNB in a handover preparation procedure (for example, in a Handover Request message) to enable the target eNB to decide or select the suitable configuration (e.g., DRX configuration) for the UE with consideration for diverse data applications. The specific UE-related information could be multiple sets of UE configurations (such as configurations for DRX, CQI, SRS, measurement, or etc.), time information (such as inter packet transmission time of a service or the time interval between the transmissions of specific messages from the UE), or the period the UE uses a specific configuration.

Figure 7:
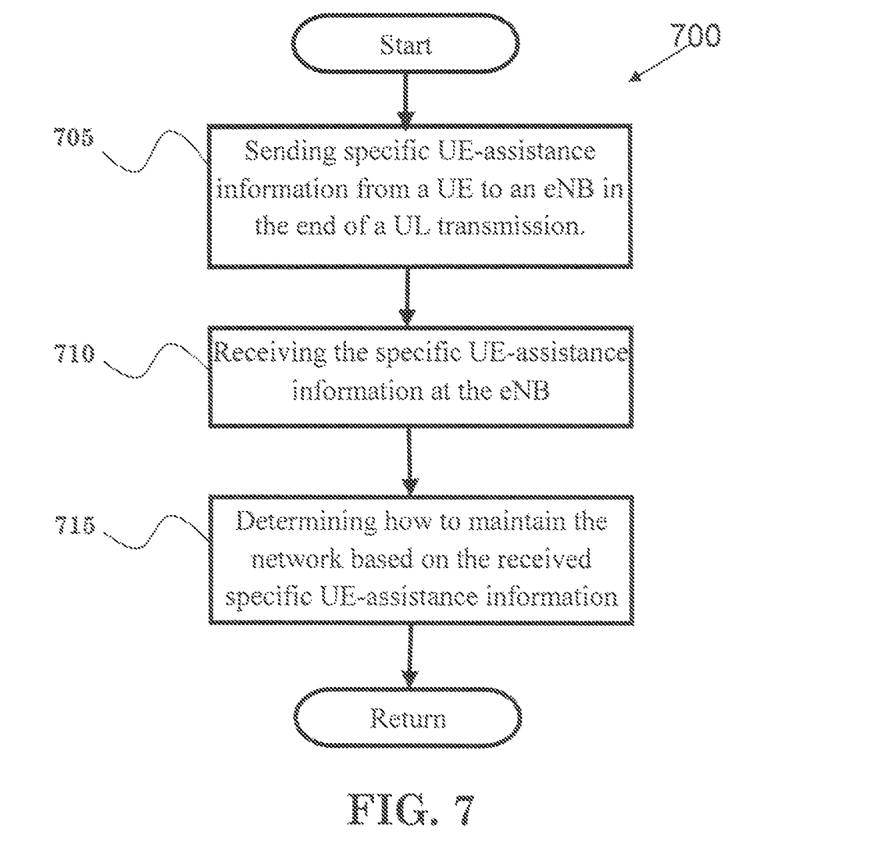
FIG. 7 shows a flow chart in accordance with one exemplary embodiment.

FIG. 7 illustrates a flow chart 700 in accordance with one exemplary embodiment. In step 705, the UE sends, provides, or reports specific UE-assistance information to the eNB at certain timing. In one embodiment, the specific UE-assistance information could be related to remaining batter power of the UE, or the UE's preference about the power saving configuration (such as enter idle mode or enter long DRX in connected mode). Furthermore, the specific UE-assistance information could be provided in the end of a UL transmission or in the end of a UL transmission of a service. The specific UE assistance information could also be carried by a RRC message, or provided in a RRC connection establishment procedure (such as a RRC Connection Request message or, a RRC Connection Setup Complete message), a RRC connection re-establishment procedure (such as a RRC Connection Reestablishment Request message or a RRC Connection Reestablishment Complete message), or a handover procedure (such as a RRC Connection Reconfiguration Complete message). In one embodiment the specific UE-assistance information could be carried by a RRC Connection Release Request message used to request the eNB to release the RRC Connection for the UE, or by a RRC Power Saving Request message used to request the eNB to change the configuration of the UE to save the power. In step 710 of FIG. 7, the eNB receives the specific UE-assistance information. In step 715, the eNB makes certain decision based on the received specific UE-assistance information, such as deciding the power saving choice (as shown, for example, in Alt. 1 or Alt. 2 of FIG. 5 and discussed in 3GPP document R2-112817).

Referring back to FIGS. 3 and 4, the UE 300 includes a program code 312 stored in memory 310. In one embodiment, the CPU 308 could execute the program code 312 to send specific UE-assistance information from a UE (user equipment) to an eNB (evolved Node B) at a particular timing. In addition, the CPU 308 can execute the program code 312 to perform all of the above-described actions and steps or others described herein.

Figure 8:
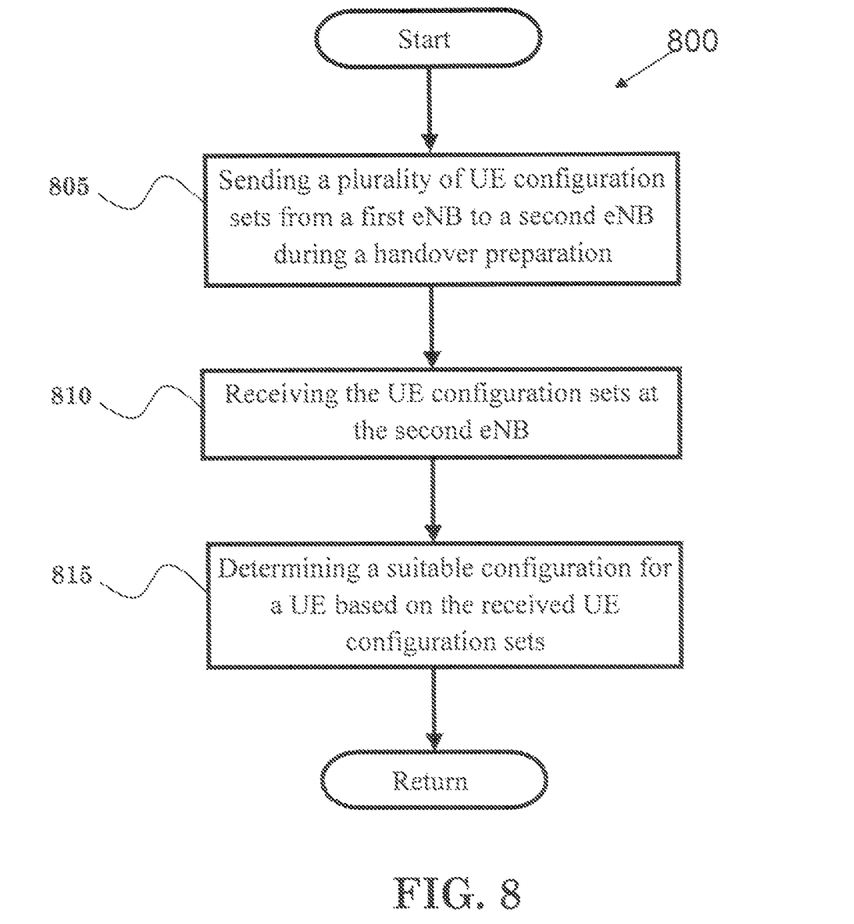
FIG. 8 is a flow chart in accordance with one exemplary embodiment.

FIG. 8 illustrates a flow chart 800 in accordance with one exemplary embodiment. In step 805, the source eNB sends or provides more than one UE configuration sets to the target eNB during handover preparation. In one embodiment, the UE configuration sets could include configuration for DRX (discontinuous reception), CQI (channel quality indicator), and/or SRS (sounding reference symbol). Furthermore, the UE configuration sets could be carried in a Handover Request message. In step 810, the target eNB receives the UE configuration sets. In step 815, the target eNB determines a suitable configuration (for example, the DRX configuration) for the UE, which is typically configured with one set of configuration at a time.

Referring back to FIGS. 3 and 4, a source eNB 300 includes a program code 312 stored in memory 310. In one embodiment, the CPU 308 could execute the program code 312 to send specific UE-related information from a source eNB (evolved Node B) to a target eNB during handover preparation. In addition, the CPU 308 can execute the program code 312 to perform all of the above-described actions and steps or others described herein.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience; as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method to provide assistance information for reconfiguration, comprising:
   sending an indication of remaining power of a UE (user equipment) from the UE to an eNB (evolved Node B) at a particular timing.

2. The method of claim 1, wherein the particular timing is at the end of a UL (uplink) transmission, at the end of a UL transmission of a service, during a RRC (Radio Resource Control) connection establishment procedure, during a RRC connection re-establishment procedure, or during a handover procedure.

3. A method to provide assistance information for reconfiguration, comprising:
   sending an indication of a duration of a UE (user equipment) stayed in RRC IDLE (Radio Resource Control Idle) last time from the UE to an eNB (evolved Node B) at a particular timing.

4. The method of claim 3, wherein the particular timing is during a RRC (Radio Resource Control) connection establishment procedure or a RRC connection re-establishment procedure.

5. The method of claim 3, wherein the indication is carried by a RRC (Radio Resource Control) Connection Request message or a RRC Connection Setup Complete message.

6. A communication device for use in a wireless communication system, the communication device comprising:
   a control circuit;
   a processor installed in the control circuit;
   a memory installed in the control circuit and coupled to the processor;
   wherein the processor is configured to execute a program code stored in the memory for providing assistance information for reconfiguration by:

sending an indication of remaining power of the communication device from the communication device to an eNB (evolved Node B) at a particular timing.

7. The communication device of claim 6, wherein the particular timing is at the end of a UL (uplink) transmission, at the end of a UL transmission of a service, during a RRC (Radio Resource Control) connection establishment procedure, during a RRC connection re-establishment procedure, or during a handover procedure.

8. A communication device for use in a wireless communication system, the communication device comprising:
   a control circuit;
   a processor installed in the control circuit;
   a memory installed in the control circuit and coupled to the processor;
   wherein the processor is configured to execute a program code stored in the memory for providing assistance information for reconfiguration by:
      sending an indication of a duration of the communication device stayed in RRC_IDLE (Radio Resource Control Idle) last time from the communication device to an eNB (evolved Node B) at a particular timing.

9. The communication device of claim 8, wherein the particular timing is during a RRC (Radio Resource Control) connection establishment procedure or a RRC connection re-establishment procedure.

10. The communication device of claim 8, wherein the indication is carried by a RRC (Radio Resource Control) Connection Request message or a RRC Connection Setup Complete message.

* * * * *